(12) United States Patent
Colby et al.

(10) Patent No.: US 10,336,026 B2
(45) Date of Patent: Jul. 2, 2019

(54) USE OF VACUUM TO INCREASE EFFECTIVE SKID DEPTH OF PRE-CURED TREAD

(71) Applicants: Compagnie Generale des Etablissements Michelin, Clermont-Ferrand (FR); Michelin Recherche et Technique S.A., Granges-Paccot (CH)

(72) Inventors: E Bruce Colby, Simpsonville, SC (US); Cesar Enrique Zarak, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 591 days.

(21) Appl. No.: 15/025,407

(22) PCT Filed: Sep. 27, 2013

(86) PCT No.: PCT/US2013/062443
§ 371 (c)(1),
(2) Date: Mar. 28, 2016

(87) PCT Pub. No.: WO2015/047340
PCT Pub. Date: Apr. 2, 2015

(65) Prior Publication Data
US 2016/0229142 A1    Aug. 11, 2016

(51) Int. Cl.
*B29D 30/56* (2006.01)
*B60C 11/02* (2006.01)
*B29D 30/54* (2006.01)

(52) U.S. Cl.
CPC .............. *B29D 30/56* (2013.01); *B60C 11/02* (2013.01); *B29D 2030/541* (2013.01); *B29D 2030/544* (2013.01); *B29D 2030/546* (2013.01)

(58) Field of Classification Search
CPC ... B60C 11/02; B29D 30/56; B29D 2030/541; B29D 2030/544; B29D 2030/546
See application file for complete search history.

(56) References Cited

U.S. PATENT DOCUMENTS

| | | | |
|---|---|---|---|
| 4,115,171 A | 9/1978 | Dundon | |
| 4,696,332 A | 9/1987 | Koch | |
| 4,934,426 A | 6/1990 | Remond | |
| 2012/0097300 A1* | 4/2012 | Colby | B29D 30/56 152/154.2 |

(Continued)

FOREIGN PATENT DOCUMENTS

| | | | |
|---|---|---|---|
| GB | 1552841 A | | 9/1979 |
| JP | 2002-067622 A | * | 3/2002 |
| JP | 2010-173614 A | * | 8/2010 |

(Continued)

OTHER PUBLICATIONS

Machine translation for Japan 2010-173614 (Year: 2018).*

(Continued)

*Primary Examiner* — Steven D Maki
(74) *Attorney, Agent, or Firm* — Neal P. Pierotti (57) ABSTRACT

A method for increasing effective skid depth on a retreaded tire is provided along with a retreaded tire assembly. A kit for increasing effective skid depth of a retreaded tire is also provided.

10 Claims, 6 Drawing Sheets

(56) References Cited

U.S. PATENT DOCUMENTS

2012/0103485 A1* 5/2012 Colby .................. B29D 30/56
                                                    152/154.2
2013/0276944 A1   10/2013 Panning et al.

FOREIGN PATENT DOCUMENTS

| WO | WO 2012091708 A1 | 7/2012 |
| WO | WO-2013/048480 A1 * | 4/2013 |
| WO | 2013/066310 A1 | 5/2013 |
| WO | WO 2013095406 A1 | 6/2013 |
| WO | WO-2013/095406 A1 * | 7/2013 |

OTHER PUBLICATIONS

Machine translation for Japan 2002-067622 (Year: 2018).*
International Search Report with written opinion dated Mar. 18, 2014.
European Patent Office, Supplementary European Search Report, Communication from European Patent Application No. 13894328.7, dated Apr. 12, 2017, 7 pages, European Patent Office, published in Munich, DE.

* cited by examiner

USE OF VACUUM TO INCREASE EFFECTIVE SKID DEPTH OF PRE-CURED TREAD

TECHNICAL FIELD

The presently disclosed invention is generally directed to methods for increasing effective skid depth of a pre-cured tread and retreaded tires derived therefrom.

BACKGROUND

Figure 1:
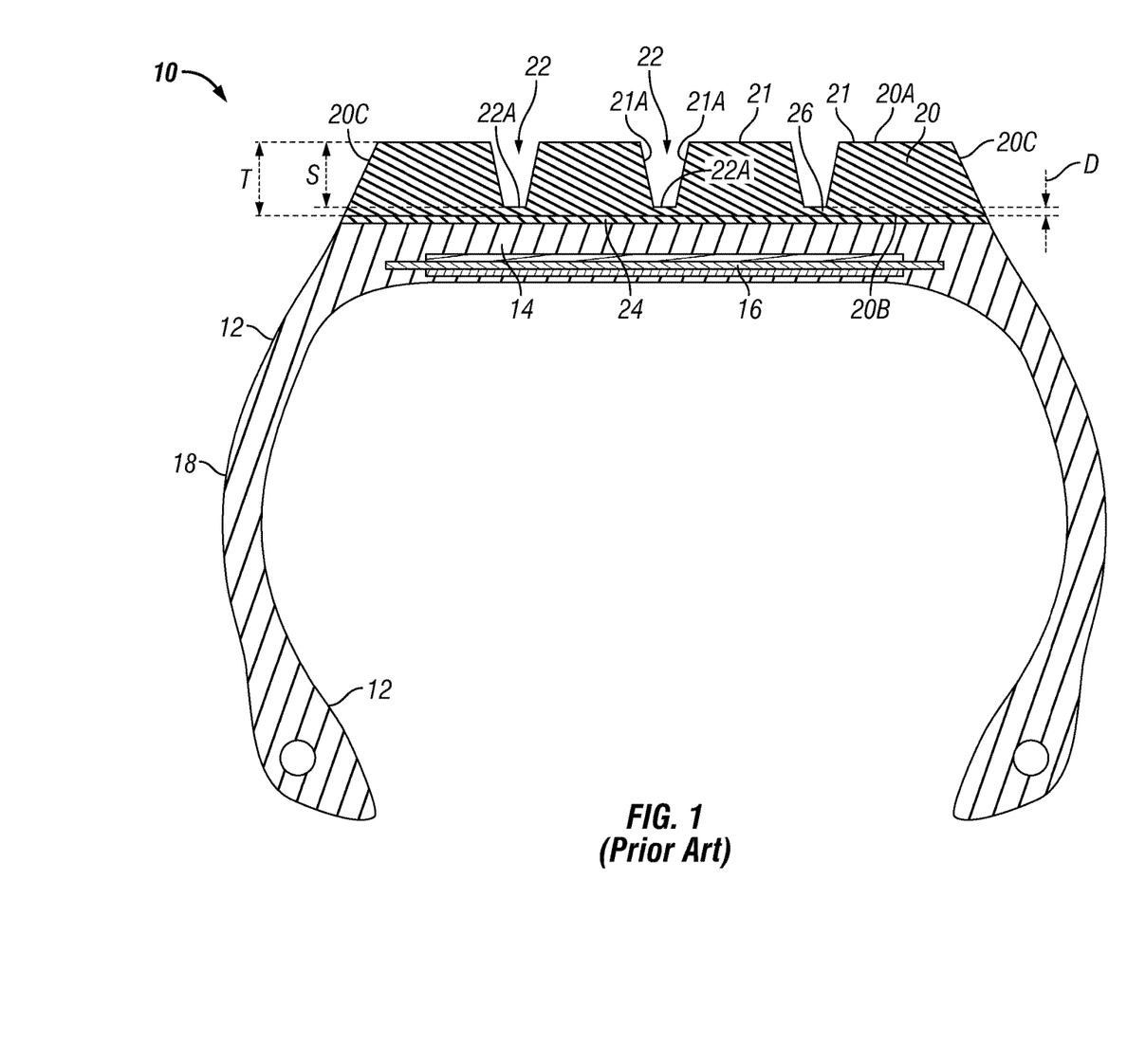
FIG. 1 shows a side cross-sectional view taken laterally across a retreaded tire as known in the art.

For the restoration of tire treads on various vehicles, a variety of pre-cured treads have been designed for use in tire retreading processes. FIG. 1 illustrates an exemplary pre-cured tread as used on a retread tire 10. Tire 10 includes a tire carcass 12 with a crown section 14, reinforcement 16 and sidewall 18. Crown section 14 may have been buffed or otherwise worked to provide a prepared bonding surface to which a laterally extending tread 20 can be bonded. Buffing old tread off of the tire in preparation for retreading removes rubber that is discarded as waste. Much of this waste rubber is typically replaced during the retreading process as part of the undertread portion of the tread that is bonded to the carcass.

A tread 20 that is applied to carcass 12 includes respective top and bottom faces 20a, 20b and a predetermined thickness T coextensive therewith. Tread 20 also extends between opposing lateral sides 20c that may be coextensive with tire carcass 12. One or more tread elements 21 are integral with tread 20 in a variety of configurations as known in the art to impart predictable and repeatable performance characteristics to any tire upon which tread 20 is employed.

Tread 20 further incorporates a plurality of longitudinal grooves 22 that may be provided in communication with one or more lateral grooves (not shown) as known in the art. Grooves 22 have a predetermined width delineated by opposing sides 21a of adjacent tread elements 21. Each groove 22 terminates at a groove trough 22a that is offset by a distance D from tread bottom face 20b. A layer of bonding material 24 is arranged between bottom tread face 20b and tire carcass 12. Bonding material 24 may be selected from any amenable boding material, including but not limited to bonding rubber and adhesive.

In retreading operations, distance D often corresponds to an undertread 26 having a thickness at or about equal to distance D (i.e., the thickness of the undertread of pre-cured tread 20). It is understood that the undertread thickness of the pre-cured tread is differentiated from the total tire undertread thickness that is obtained after completion of a retreading process.

Undertread 26 of tire 10 is positioned vertically (i.e., perpendicular to the ground contacting surface of the tread) between groove troughs 22a and reinforcement 16. Undertread 26 provides a cushion and/or protective layer between the ground contacting tread and reinforcement 16 in tire carcass 12, thereby ensuring reinforcement 16 is not exposed through the wearing of the grooved tread area.

A skid depth S is generally defined by a difference between thickness T between top and bottom tread faces 20a, 20b and the thickness of the undertread of pre-cured tread 20 (e.g., distance D). Skid depth may therefore be identified and measured as the thickness of useful tread contained within the pre-cured tread (i.e., a thickness purposely rendered available for wearing during vehicle operations). Pre-cured treads often contain an undertread having a thickness from about 3.0 to about 4.0 mm inclusive to provide rigidity and stability during processing. Not only is this quantity over and above the actual skid depth: the undertread is added to the bonding layer and the material over the belts (e.g., reinforcement 16 as shown in FIG. 1) on the tire being retreaded. Thus, the total undertread of the retreaded tire becomes the sum of these three layers.

During retreading processes, tires are encased in flexible covers (or "envelopes") and disposed in an autoclave. Air in the autoclave is pressurized (e.g., from between 1 to 6 bars) to force the new tread against the carcass and thereby achieve a uniform, tight bond. The air is heated to a temperature sufficient to produce the vulcanization reaction of the bonding layer interposed between the tread and carcass. While reducing the thickness of the undertread (e.g., reducing distance D) would realize desired weight savings in the pre-cured tread, thinly fabricated undertreads have heretofore led to decreased stability of the tread structure against the bonding layer during the curing operation because of the action of the envelope.

One solution is disclosed by co-owned U.S. Pat. No. 4,934,426 that is directed to curing of a pre-cured tread on a carcass without use of an envelope (the entire disclosure of U.S. Pat. No. 4,934,426 is incorporated by reference herein). A network of shallow channels provided along a bottom surface of the pre-cured tread facilitates removal of all air between the two surfaces upon application of a vacuum. Bonding is ensured initially by atmospheric pressure and subsequently by high pressure within an autoclave within which the assembly is treated. Such process beneficially eliminates air from between the tread and the carcass without addressing skid depth.

Additional benefits may therefore be realized by a pre-cured tread having a reduced undertread thickness that reduces weight and discarded rubber without sacrificing effective skid depth. A retread method that employs such a tread would optimize carcass sculpture in concert with tread sculpture to ensure a skid depth at least equal to that of prior treads of greater weight and thickness.

SUMMARY

A method for increasing effective skid depth is provided that includes providing a tire carcass having one or more worn original grooves and a pre-cured tread. The pre-cured tread includes opposing top and bottom tread faces delineating a coextensive tread thickness and opposing lateral sides defining a tread width along which adjacent tread elements assume a tread sculpture. One or grooves are provided on the top tread face with each groove terminating at a predetermined offset distance from the tread bottom face. A network of channels may be incorporated along at least a portion of the tread bottom face. The pre-cured tread also includes a thin undertread having a predetermined undertread thickness. One or more groove hollows are formed directly over corresponding original grooves of the carcass, with the groove hollows formed to match locations of the grooves provided on the top tread face. Gas is evacuated along the channel network to force the tread onto the carcass and pull the undertread into the groove hollows. Forming the groove hollows deepens the original grooves by a predetermined net depth. After evacuating the gas, a resultant skid depth is at least equal to a molded tread thickness of the pre-cured tread.

The presently disclosed method may also include providing a pre-cured tread having an undertread thickness equal to the predetermined offset distance. In some embodiments, the carcass is buffed, and the buffing includes one of buffing at least a portion of the carcass and removing substantially all of the original grooves. The groove hollows may be ground directly over corresponding original grooves of the carcass. The bottom tread face and the carcass may be bonded, and the assembly may be heated while the gas is evacuated.

A retreaded tire assembly is also provided that includes a tire carcass having one or more worn original grooves with groove hollows formed directly thereover to deepen the original grooves by a predetermined net depth. The tire assembly also includes a pre-cured tread having opposing top and bottom tread faces delineating a tread thickness coextensive therewith. Opposing lateral sides of the pre-cured tread define a tread width along which adjacent tread elements assume a tread sculpture. One or more grooves are provided on the top tread face with each groove terminating at a predetermined offset distance from the tread bottom face. A network of channels may be incorporated along at least a portion of the tread bottom face. The pre-cured tread also includes a thin undertread having a predetermined undertread thickness. In the tire assembly, the groove hollows are formed to match locations of the grooves provided on the top tread face. Evacuation of gas along the channel network forces the tread onto the carcass and pulls the undertread into the groove hollows. A resultant skid depth of the assembly is at least equal to a molded tread thickness of the pre-cured tread.

A kit is also provided for increasing effective skid depth of a retreaded tire. The kit includes a retreaded tire assembly having a carcass and a pre-cured tread as presently disclosed. The kit also includes a vacuum source for evacuating gas along the channel network, and a heating source for heating the assembly during gas evacuation. The vacuum source evacuates gas from the channel network during heating of the assembly such that a resultant skid depth of the assembly is at least equal to a molded tread thickness of the pre-cured tread.

Other aspects of the presently disclosed apparatus will become readily apparent from the following detailed description.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION

As presently disclosed, for economy, durability and reduced rolling resistance, the amount of rubber removed from a used casing may be limited. The additional new rubber required to make the pre-cured tread may also be limited to optimize such results. Typically, the amount of rubber removed from the carcass being retreaded, in order to facilitate the process, is restricted to the amount of rubber needed to leave a clean, well-textured profile. Additional improvements to curing without envelopes are thus contemplated herein using a thin pre-cured tread pulled into grooves in the prepared carcass surface to obtain a final skid depth greater than the molded tread thickness of the pre-cured tread.

Particular embodiments of the presently disclosed invention include a step of applying the tread to a tire carcass where a layer of bonding material is arranged between the tire tread and the tire carcass. In doing so, a retreaded tire is assembled. During retreading operations, the tire tread (i.e., the "retread") is arranged upon the tire carcass. When the tire tread comprises a strip of tread, such as when molded in a flat mold, for example, the tread is wrapped around the tire carcass. When the tire tread is an annular tread band, the tread band is positioned around the tire carcass, where the tire carcass is arranged within a central opening of the tread band. It is appreciated that the bonding layer may comprise any bonding material known to one of ordinary skill used for bonding the pre-cured tire tread to a tire carcass. For example, the bonding material may comprise any elastomeric or polymeric material, such as natural or synthetic rubber, which is curable and promotes bonding by way of cross-linking. In particular embodiments, in performing the step of assembling, the bonding layer comprises uncured bonding material.

Further embodiments of the presently disclosed invention include curing the tread to the tire carcass. The retread curing process is performed generally within a curing vessel (e.g., an autoclave), although it is appreciated that any known method for curing the tread to the tire carcass may be employed. The curing vessel generally includes a curing chamber providing a controlled environment in which the tire-membrane assembly is cured. Generally during the curing process, the chamber is pressurized to a desired pressure and heated to a desired temperature based upon a recipe or formula. In performing the step of curing, some embodiments of the presently disclosed invention include placing the sealed fluid chamber of the tire-membrane assembly under substantial vacuum. This generally occurs at the beginning of the curing process, before pressure and heat is applied to the tire-membrane assembly in a curing chamber of a curing vessel. As used herein, "vacuum" or "under vacuum" means providing a fluid pressure equal to zero psia (pounds per square inch absolute).

Figure 2:
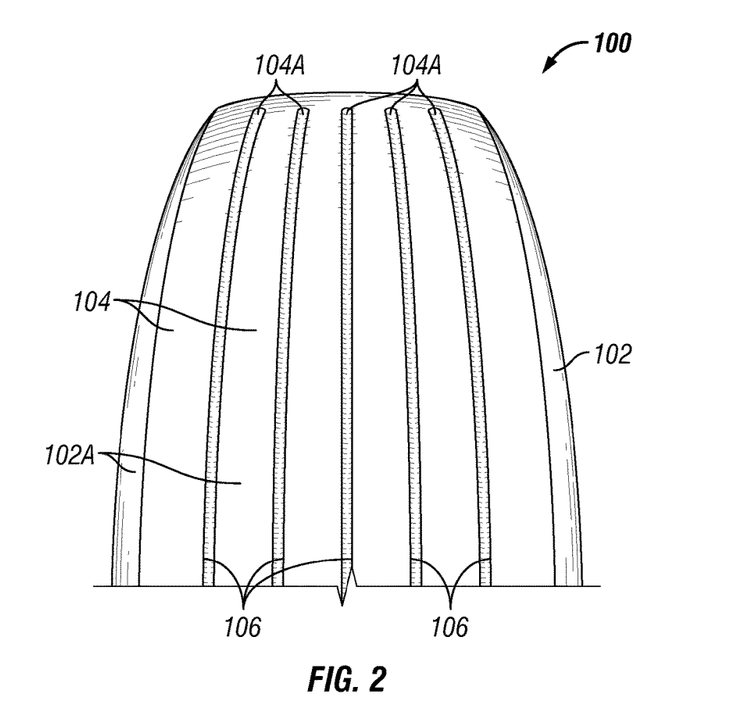
FIGS. 2 and 2A show respective partial top perspective and partial side cross-sectional views of an exemplary tire carcass as presently disclosed.
Figure 2A:
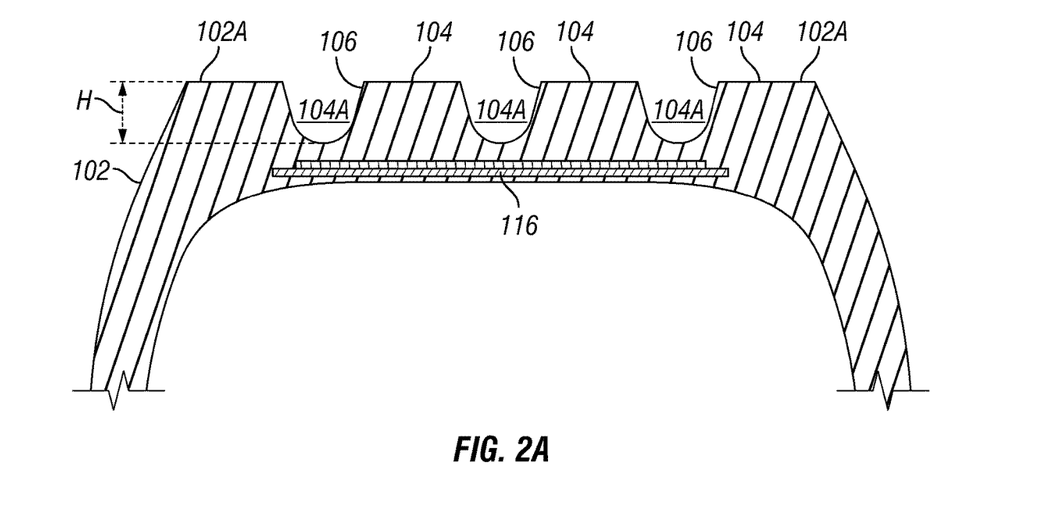

Now referring to the figures, wherein like numbers represent like elements, FIGS. 2 and 2A show an exemplary tire 100 having a carcass 102 with a surface 102A that is ready for retreading. Tire 100 that is ready for retreading has a worn grooved tread area 104 that includes worn original grooves 106 each having a groove bottom. In some embodiments, carcass 102 may be of similar original tread design to a pre-cured tread sculpture such as tread 150 (shown and further described herein with reference to FIGS. 3 and 3A).

In other embodiments, carcass 102 may be of different tread design to the pre-cured tread sculpture being applied to carcass 102.

During the retreading process, the entire worn grooved tread area, proximate a reinforcement area 116, is removed by a buffer or other grinding or cutting device or process as known. Buffing may be accomplished by one or more buffing or abrasion tools as known in the art. Such buffing or abrasion tools may include, but are not limited to, cylindrical cutters (or "peelers") and abrading devices such as rasps, grinding wheels and wire brushes. The material that is removed from tire 100 to be retreaded creates waste that is discarded and then replaced with new material that is bonded to tire carcass 102 during a subsequent retreading process. One or more groove areas 104 are buffed along the surface of carcass 102 and groove hollows 104a are ground directly over the worn grooves, effectively deepening them by a net depth H. In an exemplary embodiment, the net depth H of hollows 104a should be at or above about 3 mm±0.005 mm such that carcass surface 102a may be buffed flat. In other exemplary embodiments, the net depth H should be at or above about 2 mm±0.005 mm to incur even less buffing.

Carcass 102 is buffed down to approximately a top portion of the wear indicators (not shown), which are known in the art as indicia of the remaining skid depth. Examples of wear indicators include, but are not limited to, wear bars that are molded into a groove to indicate the remaining skid depth for the user. As long as the wear indicators have not been damaged and/or otherwise lost their usefulness due to wear and/or buffing of the tire during the retread process, the wear indicators remain as references to the user of the remaining skid depth.

Figure 3:
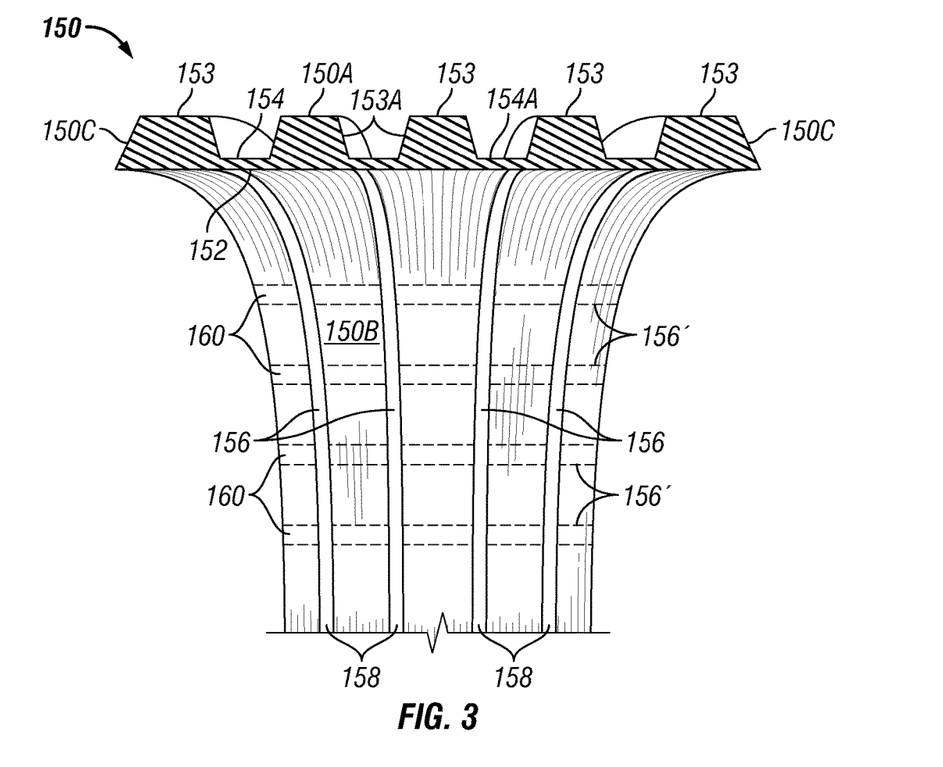
FIGS. 3 and 3A show respective partial perspective and partial side cross-sections of an exemplary tread having an exemplary channel network as presently disclosed.
Figure 3A:
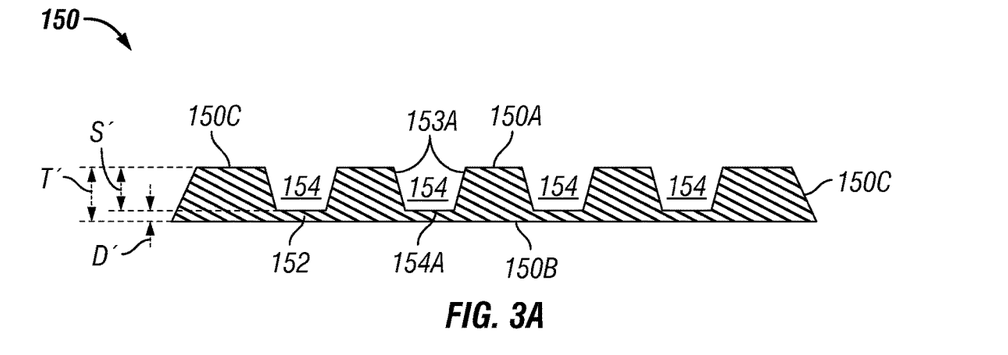

Referring further to FIGS. 3 and 3A, an exemplary pre-cured tread 150 is provided for application to carcass 102. Tread 150, fabricated with a thin undertread 152, includes respective top and bottom tread faces 150a, 150b and a predetermined thickness T' coextensive therewith. Tread 150 also extends between opposing lateral sides 150c that may be coextensive with tire carcass 102. One or more tread elements 153 are integral with tread 150 in a variety of configurations as known in the art. It is therefore understood that the configuration of tread 150 is not limited to that shown herein and that a variety of tread configurations, each having a thin undertread thickness as presently disclosed herein, are amenable for use with carcass 102.

Tread 150, and particularly top tread face 150a thereof, further incorporates a plurality of longitudinal grooves 154 that may be provided in communication with one or more lateral grooves (not shown) as known in the art. Grooves 154 have a predetermined width delineated by opposing sides 153a of adjacent tread elements 153. Each groove 154 terminates at a groove trough 154a that is offset by a distance D' from bottom tread faced 150b, which distance corresponds to the thickness of undertread 152. In an exemplary embodiment, undertread 152 exhibits a threshold thickness at or less than about 1 mm±0.005 mm. The difference between treads thickness T' and undertread thickness D' is effectively represented by a skid depth S' (see FIG. 3A).

Referring further to FIG. 3, a network 156 of channels 158 is incorporated along at least a portion of tread bottom face 150b. As depicted in FIG. 3, in some embodiments, channel network 156 includes a plurality of circumferentially aligned channels 158 sufficient to transport air across bottom tread face 150b. Channels 158 may be located under thicker portions of tread 150 (i.e., those portions corresponding to tread elements 153), representing the wear indicators. As further depicted in FIG. 3, in some embodiments, a channel network 156' (shown in phantom) includes a series of continuous circumferential channels 158 provided in communication with a plurality of lateral channels 160. It is understood that the geometries of channel networks 156 and 156' are not limited to the network architecture shown in the figures, and that other network architectures may be employed by the channel network that are amenable to practice of the presently disclosed invention. For example, a network of channels may be provided comprising a plurality of acute-angled cells.

Figure 4:
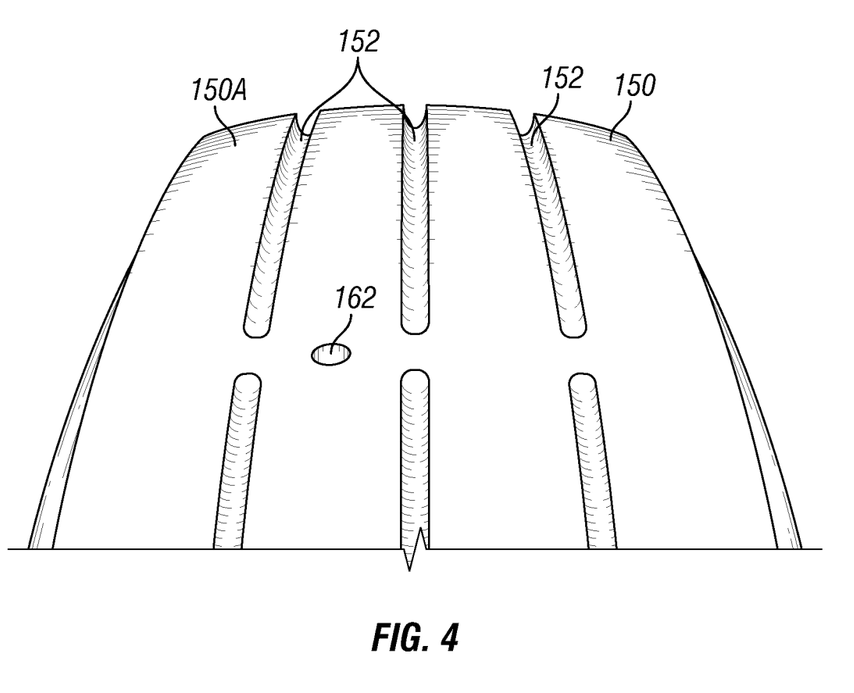
FIG. 4 shows a partial top perspective view of the tread of FIG. 3 having a port incorporated therein.

Referring to FIG. 4, at least one port 162 is provided in tread 150 that provides an ingress to a conduit 164 (as shown and described further with respect to FIG. 5) for application of a vacuum during a retreading process. In some embodiments, port 162 may comprise a single port as shown that communicates a vacuum via an ingress provided along a top tread face 150a, which ingress may be particularly provided in a selected tread element 153 (see FIG. 5). In some embodiments, more than one port may be provided and a vacuum applied at each port, with the ports selectively disposed along a single tread element or multiple tread elements.

Figure 5:
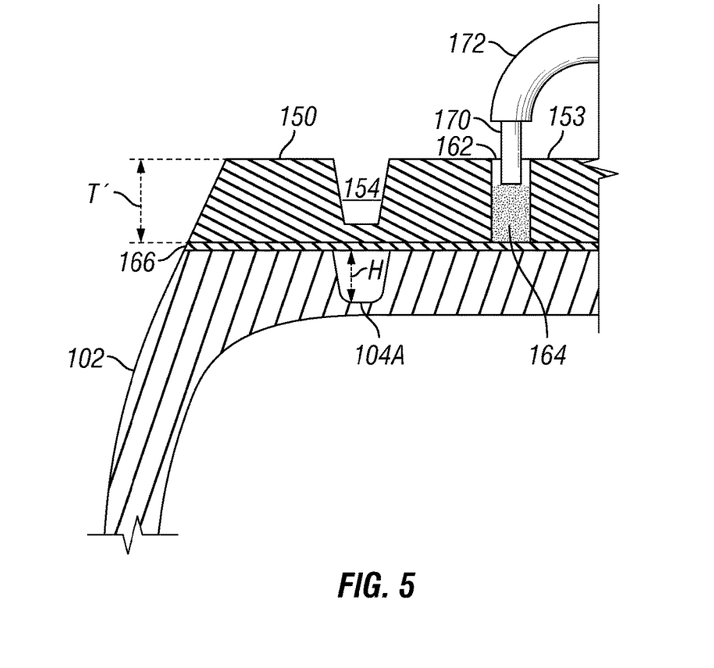
FIG. 5 shows a schematic partial cross-section of an assembly of the tire carcass of FIG. 2 and the tread of FIG. 3 during evacuation of gas as disclosed herein.

Now referring to FIG. 5, an exemplary method for increasing effective skid depth of a pre-cured tread assembly is described with reference to an assembly of carcass 102 and tread 150. Tread 150 has an undertread thickness D' and a molded skid depth S'. To obtain a retreaded tire, carcass 102 is partially buffed, leaving the bottom of each original groove 106 to be deepened by a hollow of predetermined net depth H. Tread 150 is applied such that grooves 154 thereof correspondingly align with hollows 104a of carcass 102. It is understood that, in this embodiment, pre-cured tread 150 is applied with grooves 154 thereof directly over original carcass grooves 106.

A layer 166 of a bonding compound is applied over the prepared surface of carcass 102 between bottom tread face 150b and tire carcass 102, thereby maintaining the buffed profile of the carcass. The bonding may be made by any method known to one having ordinary skill in the art, including use of a cushion gum layer. The cushion gum is typically a green (uncured) rubber compound, although it is understood that other equivalent and/or complementary materials, including but not limited to adhesives, may be employed. The bonding material for layer 166 may be sprayed, painted, spread and/or extruded onto bottom tread face 150b, carcass 102 or both. Alternatively, either alone or in combination with other bonding materials, a sheet of bonding material may be placed onto one or both of the bonding surfaces. Layer 166 facilitates cure along the bonding interface between carcass 102 and tread bottom face 150b, wherein the terms "cure" and "bonding interface" refer to the formation of cross-links between the elastomer molecules in rubber compounds.

Upon placement of the assembly in an autoclave or like heating means, and as described in part by U.S. Pat. No. 4,934,426, a vacuum duct 170 is inserted in port 162 in communication with conduit 164. Duct 170 may be connected via a hose 172 to a vacuum source as known in the art (not shown). For the duration of the heating of the assembly in the autoclave, a vacuum is applied via duct 170, thereby effecting evacuation of air and/or gasses at least along the bonding interface between tread 150 and carcass 102. The retreaded tire thus formed can be cured without an envelope by maintaining the vacuum connection throughout the autoclave cure (e.g., at about or below 0.5 bar). Application of the vacuum may be effected manually or via a programmable logic controller (PLC) or other device having a processor that can execute programmed and/or programmable instructions.

Figure 6:
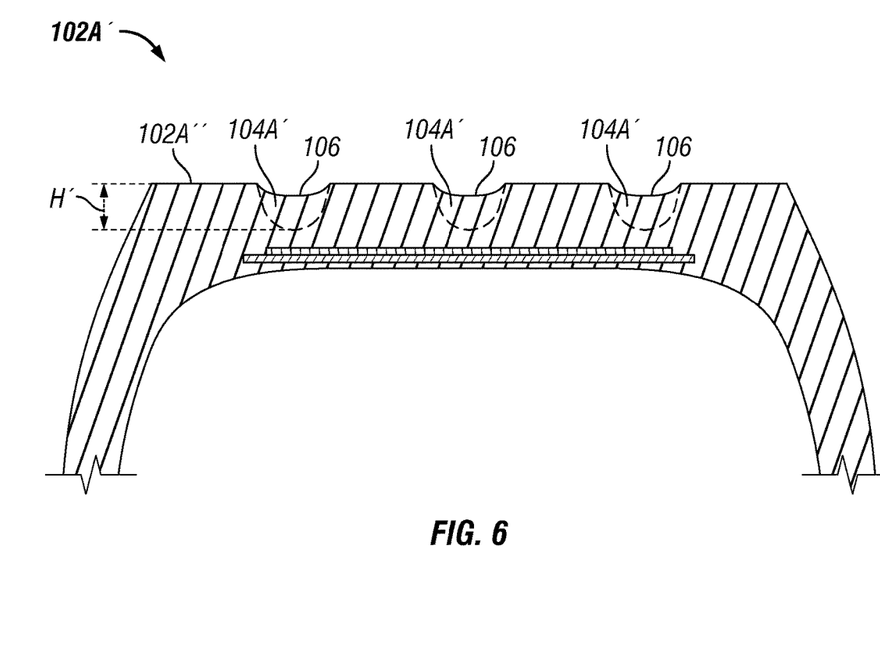
FIG. 6 shows a partial cross-section of another exemplary tire carcass as presently disclosed.

Now referring to FIG. 6, in some embodiments, the presently disclosed method may employ a carcass 102' having substantially similar features as carcass 102 shown herein. Carcass 102' is buffed to remove most or all of original grooves 106. In some embodiments, the crown of carcass 102' is buffed flat such that less material requires removal from the carcass in comparison to current retread processes (thereby reducing the fiscal and temporal costs of the buffing operation and the overall retread process). Groove hollows 104a' (shown in phantom in FIG. 6) are formed to match the groove location of grooves 154 of pre-cured tread 150. Groove hollows 104' each have a predetermined net depth H' as measured from a buffed surface 102a". In some embodiments, predetermined net depth H' may be formed up to and including 3 mm±0.005 mm. When employing carcass 102', it is unnecessary for the locations of original grooves 106 to match the locations of grooves 154. As with carcass 102, a layer of a bonding compound is applied over the prepared surface of carcass 102' between bottom tread face 150b and tire carcass 102', thereby maintaining the buffed profile of the carcass.

Figure 7:
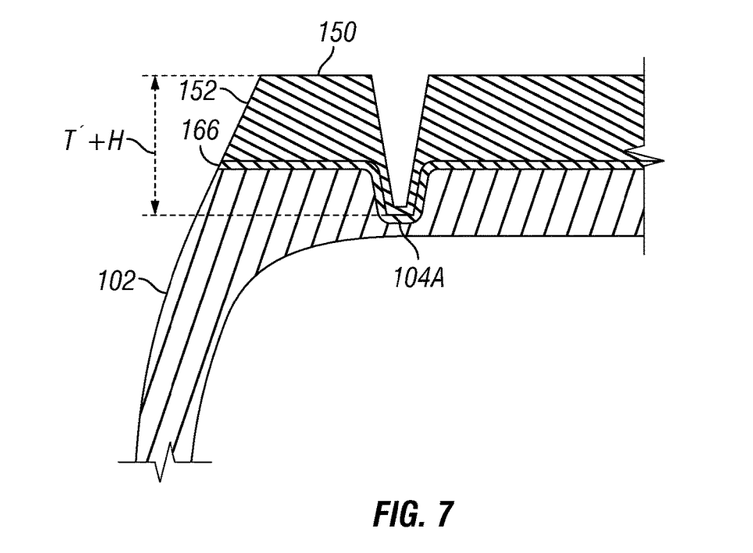
FIG. 7 shows the assembly of FIG. 5 having an exemplary resultant skid depth after evacuation of gas.
Figure 8:
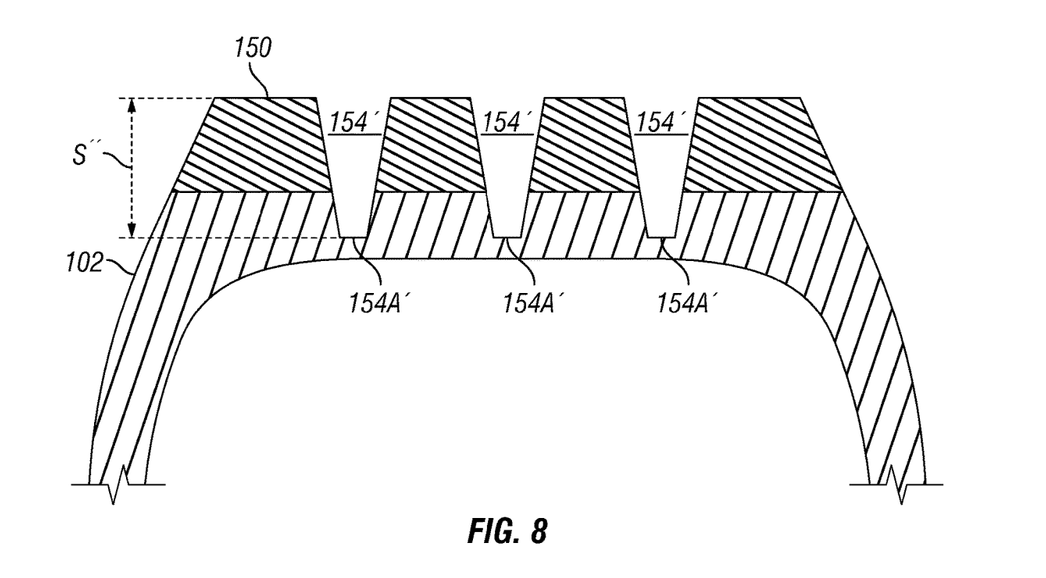
FIG. 8 shows a partial cross-section of a retreaded tire as disclosed herein.

With respect to both carcasses 102, 102', and as further shown in FIG. 7, evacuation of air and/or gases along the channels of channel network 158 allows atmospheric air pressure to force tread 150 onto carcass 102 (or, alternatively, carcass 102'). Simultaneously, as all of the air between the tread and carcass surfaces is removed, thin undertread 152 of tread 150 pulls into hollows 104a of carcass 102. This effect is at least partially attributable to alignment of hollows 104a in carcass 102 (or carcass 102') with grooves 154 of tread 20, which alignment facilitates migration of undertread 152 into hollows 104a. As shown in FIG. 8, a retreaded tire thus prepared has grooves 154' with groove troughs 154a' offset from tread top surface 150a by a resultant skid depth S". Thus, the resultant skid depth S" in the cured retreaded tire is at least equal to the thickness of the pre-cured tread.

The presently disclosed process reduces both tread weight and thickness by incorporating thin undertreads without compromising the integrity of the tread. As described herein, the undertread has already been reduced in thickness by about 2 to 3 mm, plus the net depth of the grooves ground into the carcass (e.g., at or above about 3 mm±0.005 mm in the exemplary embodiments described herein). Thus, for a given skid depth, a pre-cured tread thickness reduction of at least about 5 mm or more can be realized without sacrificing usable tread.

The presently disclosed invention enhances the attributes of existing retread tires by employing a pre-cured tread of reduced thickness and increasing the usable skid depth via application of a vacuum between the tread and the carcass. Advantage is taken of all usable material of the tire, with the effect that up to 40% less material requires removal from the carcass. Thus, since less of the original tread rubber requires removal, costs attributable to buffing processes are inherently reduced. The amount of new rubber required for the pre-cured tread is similarly reduced, thereby effectively re-using the original tread rubber on the carcass in lieu of new pre-cured tread rubber. Without an envelope, peaking in the groove bottoms usually associated with a thin undertread is eliminated. The resultant contact length across the crown between the pre-cured tread and the bonding layer results in improved tread adhesion due to increased contact area thereacross.

It is understood that the presently disclosed methods may be employed on tires that have never been retread. It is further understood that the presently disclosed methods are contemplated for use on tires that have previously been subject to one or more retread processes, either as disclosed herein or according to one or more other amenable retreading methods. The presently disclosed invention may be utilized in association with retreaded heavy duty truck or trailer tires and any other tire type, including but not limited to light truck, off-road, ATV, bus, aircraft, agricultural, mining, bicycle, motorcycle and passenger vehicle tires.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A method for increasing effective skid depth, comprising:
   providing a tire carcass having one or more worn original grooves on a surface thereof;
   providing a pre-cured tread, comprising:
   opposing top and bottom tread faces delineating a tread thickness coextensive therewith;
   opposing lateral sides defining a tread width along which adjacent tread elements assume a tread sculpture;
   one or more grooves provided on the top tread face with each groove terminating at a predetermined offset distance from the tread bottom face;
   a network of channels incorporated along at least a portion of the tread bottom face; and
   a thin undertread having a predetermined undertread thickness;
   forming one or more groove hollows directly over corresponding original grooves of the carcass, with the groove hollows formed to match locations of the one or more grooves provided on the top tread face;

applying at least one layer of a bonding material between the bottom tread face and the carcass; and curing the at least one layer of the bonding material without an envelope and evacuating gas along the channel network to force the tread onto the carcass and pull the undertread into the one or more groove hollows that are in fluid communication with the channel network such that a resultant skid depth is at least equal to a molded tread thickness of the pre-cured tread;

wherein forming the groove hollows deepens the original grooves by a predetermined net depth.

2. The method of claim 1, further comprising at least one of:

providing a pre-cured tread having an undertread thickness equal to the predetermined offset distance;

buffing the carcass, wherein the buffing includes one of:
buffing at least a portion of the carcass; and
removing substantially all of the original grooves;

grinding the one or more groove hollows directly over corresponding original grooves of the carcass;

bonding the bottom tread face and the carcass; and
heating the assembly while the gas is evacuated.

3. The method of claim 2, wherein the applying includes one or more of spraying, painting, spreading, extruding and laying a sheet of the bonding material on to at least one of the bottom tread face and the carcass.

4. The method of claim 2, wherein evacuating the gas includes applying a vacuum via at least one port that defines a conduit through the thickness of the tread.

5. The method of claim 4, wherein applying the vacuum is selectively effected manually or via a programmable logic controller (PLC).

6. The method of claim 2, wherein the undertread thickness of the pre-cured tread does not exceed about 1 mm.+−.0.005 mm, and the predetermined net depth is at or above about 2 mm.+−.0.005 mm.

7. The method of claim 2, wherein the tread sculpture is of similar configuration to a tread sculpture of the carcass.

8. The method of claim 2, wherein the channel network includes at least one of a plurality of circumferentially aligned channels and a series of lateral channels sufficient to transport air across the bottom tread face.

9. The method of claim 8, wherein a plurality of circumferentially aligned channels is provided in communication with one or more lateral channels.

10. The method of claim 2, wherein the buffing is effected by one or more buffing tools selected from cylindrical cutters, rasps, grinding wheels and wire brushes.

* * * * *